US012636848B2

(12) United States Patent
Chen

(10) Patent No.: US 12,636,848 B2
(45) Date of Patent: May 26, 2026

(54) PAPER CUTTING AND CREASING EQUIPMENT BASED ON SYNCHRONOUS COMBINATION OF CONVEX AND CONCAVE CAMS

(71) Applicant: SAGA COMPUTER NUMERICAL CONTROL CO., LTD., Hefei City (CN)

(72) Inventor: Hong Chen, Hefei City (CN)

(73) Assignee: Saga Computer Numerical Control Co., Ltd., Hefei City (CN)

( * ) Notice: Subject to any disclaimer, the term of this patent is extended or adjusted under 35 U.S.C. 154(b) by 0 days.

(21) Appl. No.: 19/271,594

(22) Filed: Jul. 16, 2025

(65) Prior Publication Data

US 2025/0340036 A1 Nov. 6, 2025

(30) Foreign Application Priority Data

Apr. 28, 2025 (CN) ......................... 202520820210.9

(51) Int. Cl.
*B31B 50/59* (2017.01)
*B31B 50/14* (2017.01)

(52) U.S. Cl.
CPC ........... *B31B 50/142* (2017.08); *B31B 50/59* (2017.08)

(58) Field of Classification Search
USPC .......................................................... 493/340
See application file for complete search history.

(56) References Cited

U.S. PATENT DOCUMENTS 6,245,004 B1 * 6/2001 Waters .................. B26F 1/3813 493/473
2004/0082453 A1 * 4/2004 Pettersson .............. G05B 19/19 493/180
2009/0298660 A1 * 12/2009 Schaack .................... B31F 1/10 493/403
2014/0260146 A1 * 9/2014 Dudr ..................... B01D 29/111 210/348

* cited by examiner

*Primary Examiner* — Chinyere J Rushing-Tucker

(57) ABSTRACT

Disclosed is a paper cutting and creasing equipment based on synchronous combination of convex and concave cams, including a rack and a paper pressing system, where a groove is formed in a center of the paper pressing system; and a first synchronous belt entering the groove, where the first synchronous belt is arranged below paper, the first synchronous belt is also provided with a through hole, a first linear advancing part is arranged above the paper pressing system, and a second linear advancing part is arranged below the paper pressing system. The first linear advancing part is equipped with a first creasing carriage, and the original single-sided creasing of packaging paper from above is changed to double-sided creasing of packaging paper through the cooperation of a convex cam and a concave cam, thereby preventing microcracks on the back side of the packaging paper and even surface peeling.

10 Claims, 6 Drawing Sheets

PAPER CUTTING AND CREASING EQUIPMENT BASED ON SYNCHRONOUS COMBINATION OF CONVEX AND CONCAVE CAMS

TECHNICAL FIELD

The present invention belongs to the technical field of carton creasing equipment, and specifically relates to a paper cutting and creasing equipment based on synchronous combination of convex and concave cams.

BACKGROUND

In the packaging industry, to ensure precise folding during the production of paperboard boxes or packaging boxes, creasing is applied to paper in advance. This process enhances aesthetic quality of the final product. In addition, the creasing depth and angle may be controlled, which enhances the load-bearing capacity and stability of the packaging boxes, and facilitates rapid folding and bonding on automated assembly lines, thereby improving production efficiency.

The existing packaging box folding line creasing process generally adopts a cam-type single-sided creasing and cutting technology, which implements linear extrusion on a paper surface with a cam mechanism to form a V-shaped creasing groove, that is, creasing processing is performed on a printed surface of packaging paper by a cam, and linear extrusion is implemented on the paper surface to form a V-shaped creasing groove to achieve the folding of the packaging paper.

However, due to the inherent design defect of single-sided pressing, when the cam is applied to a front side of the paper in a rolling and extruding manner, a back side of the paper cannot form a corresponding deformation due to contact with a hard supporting platform, resulting in an asymmetric structure with a single-sided depression in a cross section of the creasing. This process defect directly causes stress concentration fracture of paper fibers on a flat surface during the folding process, which manifests as microcracks on the back of the folding line or even surface peeling, seriously affecting the structural integrity and appearance quality of the finished packaging product, and has certain limitations.

SUMMARY

To solve the technical problem in the prior art that microcracks or surface peeling are easily caused on the back side of packaging box paper when single-sided creasing is performed on the paper, the present invention provides a paper cutting and creasing equipment based on synchronous combination of convex and concave cams.

The objective of the present invention is achieved by the following technical solution.

A paper cutting and creasing equipment based on synchronous combination of convex and concave cams includes a rack and a paper pressing system, where the paper pressing system is mounted in the rack and configured to drive paper to move back and forth, and a groove is provided in a center of the paper pressing system; a first synchronous belt entering the groove, where the first synchronous belt is arranged below the paper, the first synchronous belt is also provided with a through hole, a first linear advancing part is arranged above the paper pressing system, a second linear advancing part is arranged below the paper pressing system, and the first linear advancing part and the second linear advancing part have a common driving structure; the first linear advancing part is equipped with a first creasing carriage, and the second linear advancing part is provided with a second creasing carriage; the second creasing carriage is connected to the first synchronous belt through an adapter block; when the driving structure drives the first linear advancing part and the second linear advancing part to move, the first creasing carriage, the second creasing carriage and the first synchronous belt simultaneously perform linear movement in the same direction; the second creasing carriage is provided with a concave cam assembly, and the first creasing carriage is provided with a concave cam assembly that coincides with an axis of the through hole and is in rolling contact with the paper from an upper part of the paper; the second creasing carriage is provided with a convex cam assembly, and the convex cam assembly passes through the through hole and is in rolling contact with the paper from a lower part of the paper; the concave cam assembly and the convex cam assembly axially rotate, and are combined with the first creasing carriage, the second creasing carriage and the first synchronous belt to perform linear motion and the rack to drive the paper to perform front and back motion, so that double-sided synchronous creasing is performed on both front and back sides of the paper.

Further, the first creasing carriage drives the concave cam assembly to move in a height direction.

Further, the convex cam assembly extends into the concave cam assembly when the concave cam assembly and the convex cam assembly crease paper.

Further, the concave cam assembly includes a concave cam seat connected to the first creasing carriage, the concave cam seat is provided with a cam groove, and a concave cam configured to be in rolling contact with paper is mounted in the cam groove.

Further, the paper pressing system includes a pedestal arranged in the rack, a plurality of second roller shafts are arrayed in the pedestal, and a first roller shaft parallel to each second roller shaft is arranged above each second roller shaft; an interlayer between the first roller shaft and the second roller shaft is configured to place paper; the paper pressing system further includes a driving part for driving all the second roller shafts to axially rotate, and a first roller shaft fixing part positioned at an end part of the first roller shaft, the first roller shaft fixing part is equipped with a paper pressing system control part, and paper pressing system control part controls all the first roller shafts to move up and down relative to the pedestal.

Further, the first roller shaft fixing part includes a roller shaft frame with a groove, a shaft sleeve fixing frame is mounted in the groove, and a plurality of shaft sleeves configured to fix the end part of the first roller shaft are arrayed in the shaft sleeve fixing frame; the first roller shaft fixing part further includes a pressure rod mounted above the shaft sleeve and passing through the roller shaft frame to extend upwards, where a part of the pressure rod positioned in the groove is sleeved with a first spring, and the first spring applies downward pressure to the shaft sleeve fixing frame to enable the first roller shaft to press paper.

Further, the paper pressing system control part includes a second handle mounted at the shaft sleeve fixing frame and a first handle mounted at the roller shaft frame; the second handle is rotatable at the shaft sleeve fixing frame, the first handle is rotatable at the roller shaft frame, the second handle is further hinged to the first handle, and when the first handle is turned upwards, the shaft sleeve fixing frame moves upwards relative to the roller shaft frame.

Further, the first creasing carriage is also equipped with a cutting knife, and the cutting knife cuts paper when the first creasing carriage, the second creasing carriage and the first synchronous belt move transversely and the rack drives the paper to move back and forth.

Further, the cutting knife moves up and down in a height direction under the driving of the first creasing carriage.

The present invention has the following beneficial effects.

1. The paper cutting and creasing equipment provided by the present invention drives a first creasing carriage, a second creasing carriage and a first synchronous belt to simultaneously and linearly move in the same direction through a transmission motor, so that the synchronous movement of the first creasing carriage and the second creasing carriage during cutting and creasing of packaging paper is improved; meanwhile, a convex-concave cam structure where a convex cam arranged at a lower part of a packaging paper surface is combined with a concave cam arranged at an upper part of the packaging paper surface is provided, and the rapid creasing at the back side of the packaging paper surface is completed by the three synchronous moving functions of the first creasing carriage, the second creasing carriage and the first synchronous belt, so that the stress concentration fracture of paper fibers on the flat surface during the folding process of the packaging box is solved.
2. The paper cutting and creasing equipment has a high degree of automation and is easy to operate, which can effectively avoid the stress concentration fracture of paper during the folding process caused by the single-sided creasing process, and prevent problems such as microcracks on the printed surface or even surface peeling.

Figure 1:
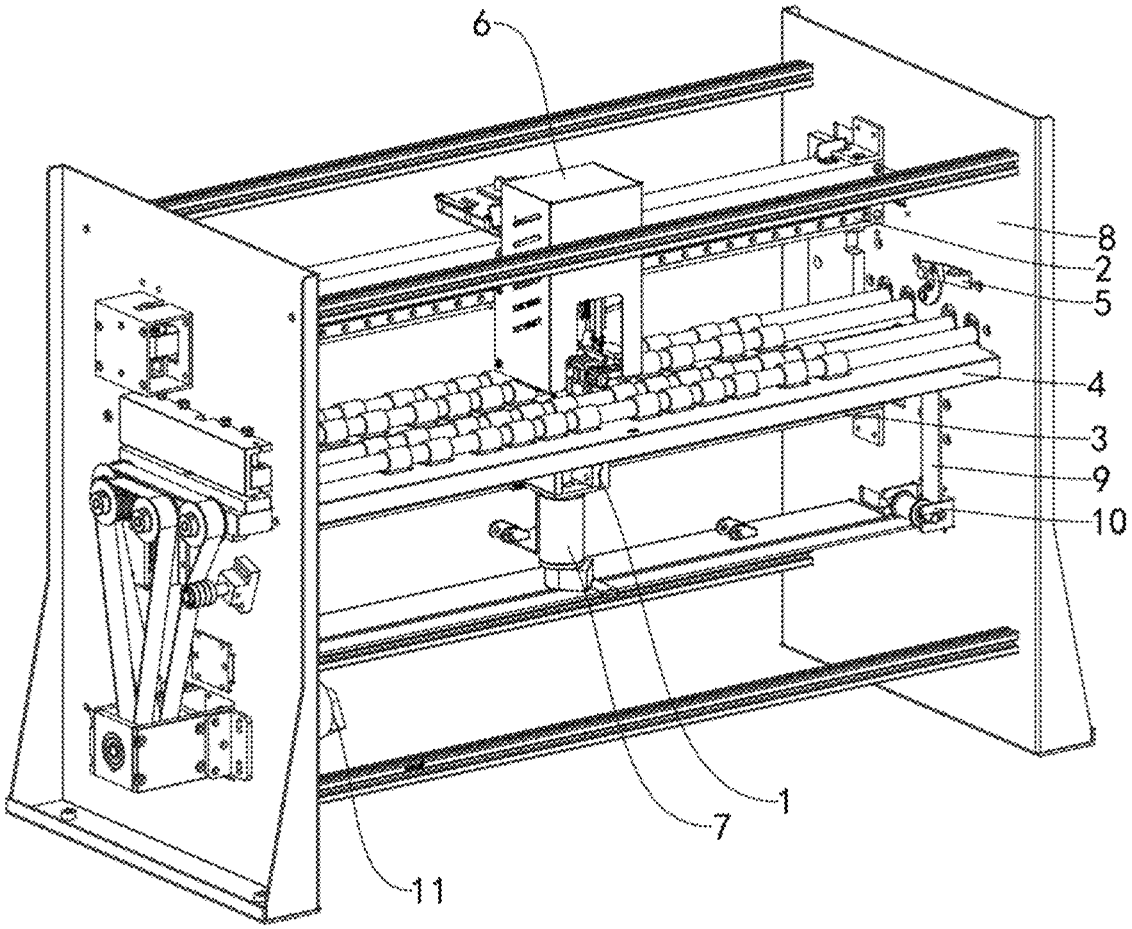
FIG. 1 is a schematic diagram of an entire structure according to the present invention.

In the drawings, the components represented by the reference numerals are listed as follows:

1. adapter block; 2. first linear advancing part; 3. second linear advancing part; 4. paper pressing system; 5. paper pressing system control part; 6. first creasing carriage; 7. second creasing carriage; 8. rack; 9. first synchronous belt; 10. first synchronous belt tension part; 11. first motor; 12. transmission shaft; 13. second motor; 14. cutting knife; 15. concave cam assembly; 16. convex cam assembly;

21. second synchronous belt; 22. second synchronous belt tension part; 23. first slide rail;

31. third synchronous belt tension part; 32. third synchronous belt; 33. second slide rail;

41. pedestal; 42. first roller shaft; 43. first roller shaft fixing part; 44. cushion block; 45. second roller shaft; 46. power transfer part; 47. belt; 48. tensioner; 49. rubber sleeve; 431. roller shaft frame; 432. shaft sleeve fixing frame; 433. limiting rod; 434. pressure rod; 435. first spring; 436. shaft sleeve;

51. first handle; 52. second handle; 53. first shaft; 54. second shaft;

61. first carriage frame; 62. third slide rail; 63. first slider; 64. first cylinder; 65. tool holder; 66. third motor; 67. fourth slide rail; 68. second slider; 69. second cylinder;

71. second carriage frame; 72. fourth motor;

81. side plate; 82. first cross beam; 83. second cross beam; 84. third cross beam;

151. concave cam seat; 152. concave cam; 153. second spring; 154. concave cam shaft; 161. convex cam seat; 162. convex cam; 163. convex cam shaft; and 17. through hole.

DETAILED DESCRIPTION OF EMBODIMENTS

The technical solutions in the embodiments of the present invention will be clearly and completely described below with reference to the drawings in the embodiments of the present invention. It is apparent that the described embodiments are only some, but not all, embodiments of the present invention. Based on the embodiments of the present invention, all other embodiments obtained by those of ordinary skill in the art without creative efforts fall within the protection scope of the present invention.

Figure 2:
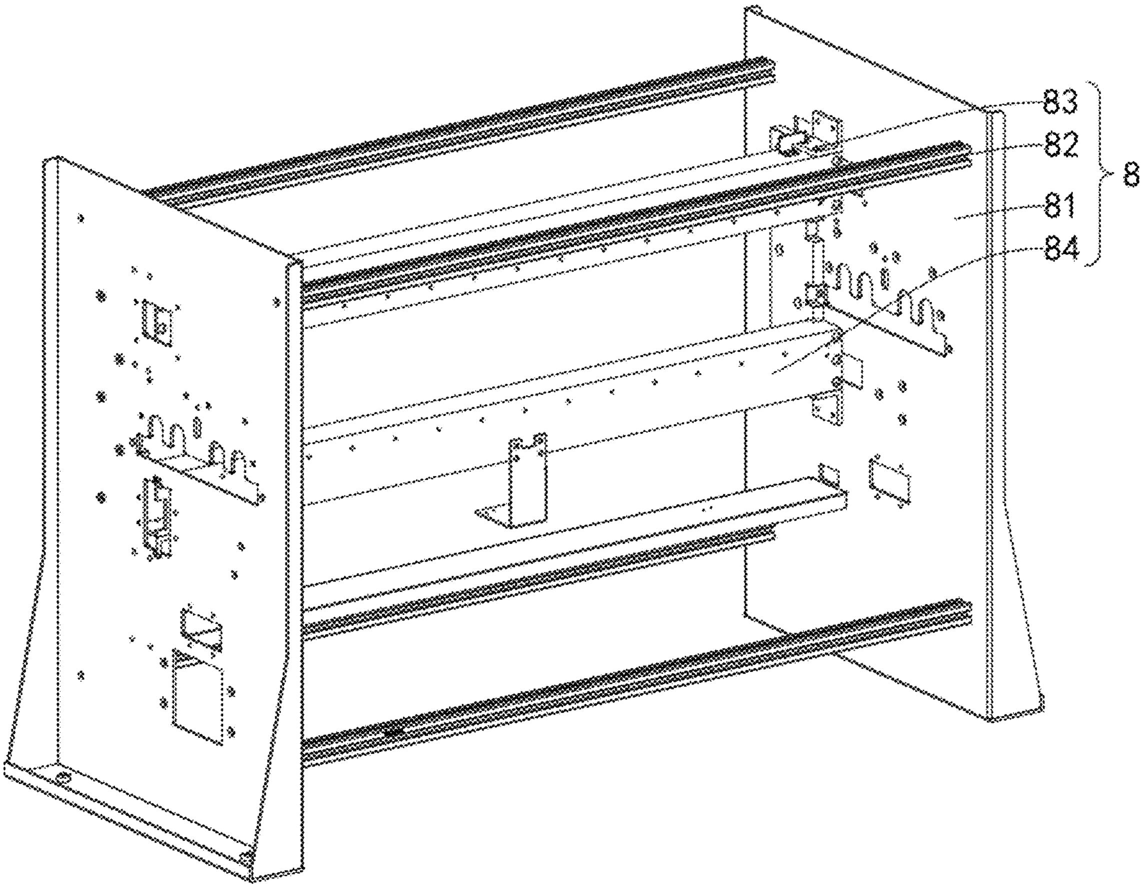
FIG. 2 is a schematic diagram of a structure of a rack according to the present invention.

Referring to FIGS. 1 to 2, a paper cutting and creasing equipment based on synchronous combination of convex and concave cams includes a rack 8 and a paper pressing system 4, where the rack 8 includes two side plates 81 arranged in parallel and four first cross beams 82 connecting to the side plates 81, and the four first cross beams 82 form an open rectangular space between the two side plates 81; a second cross beam 83 and a third cross beam 84 are arranged at a middle position in the open rectangular space along a height direction; the second cross beam 83 is fixedly connected to a first linear advancing part 2; the third cross beam 84 is fixedly connected to a second linear advancing part 3; and the paper pressing system 4 is vertically mounted between the second cross beam 83 and the third cross beam 84.

A first synchronous belt 9 is also arranged in the open rectangular space; two first synchronous belt tension parts 10 are symmetrically arranged on an inner side of each side plate 81 along a height direction; and the first synchronous belt 9 is arranged around four first synchronous belt tension parts 10 to form a closed loop transmission structure.

Figure 3:
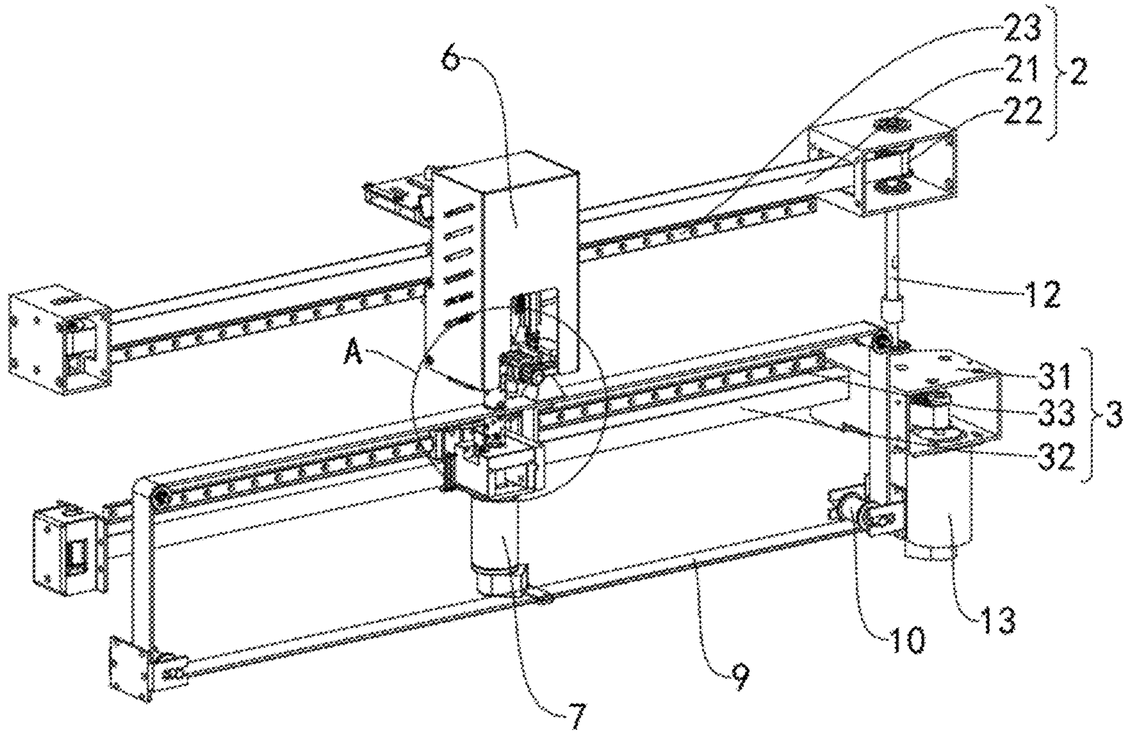
FIG. 3 is a schematic diagram of a structure of two linear advancing parts according to the present invention.
Figure 4:
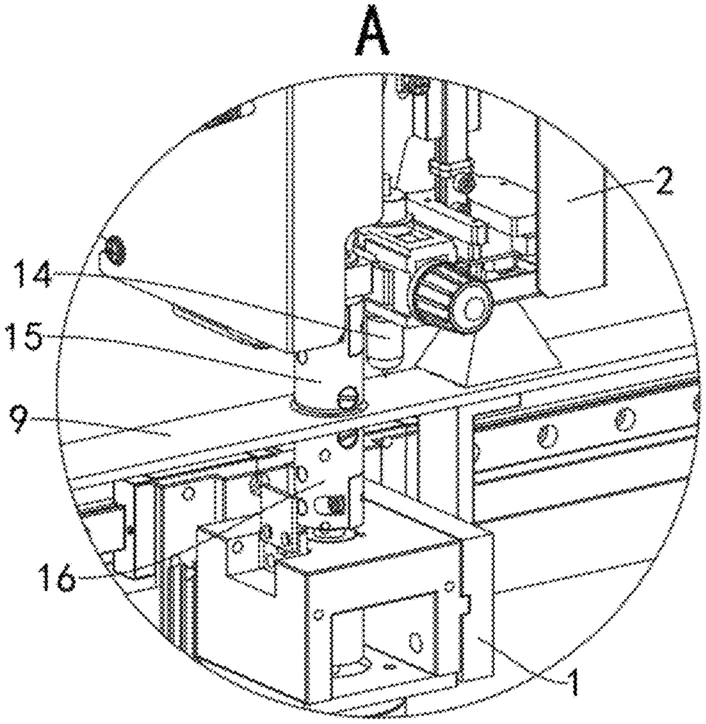
FIG. 4 is a partially enlarged schematic diagram of A in FIG. 3.

Still referring to FIG. 3, the first linear advancing part 2 includes a first slide rail 23 horizontally mounted on the second cross beam 83, second synchronous belt tension parts 22 mounted on the two side plates 81, and second synchronous belts 21 arranged around the second synchronous belt tension parts; a slidable creasing carriage 6 is arranged on a first slide rail 23, and the first creasing carriage 6 is in transmission fit with the second synchronous belt 21 through a connecting piece.

Correspondingly, the second linear advancing part 3 includes a second slide rail 33 mounted on the third cross beam 84, third synchronous belt tension parts 31 arranged on the two side plates 81, and third synchronous belts 32 arranged around the third synchronous belt tension parts; a slidable second creasing carriage 7 is arranged on a second slide rail 33, and the second creasing carriage 7 is in transmission fit with the first synchronous belt 9 through an adapter block 1.

Particularly, one of the second synchronous belt tension parts 22 and one of the third synchronous belt tension parts 31 are mechanically linked through a transmission shaft 12, when a second motor 13 drives the third synchronous belt tension part 31, the first synchronous belt 9, the second synchronous belt 21 and the third synchronous belt 32 may be synchronously driven to achieve same-direction movement, so that the first creasing carriage 6 and the second creasing carriage 7 are kept in a relatively static state during the operation, the first creasing carriage 6, and the second creasing carriage 7 and the first synchronous belt 9 are driven by the second motor 13 to simultaneously perform linear movement in the same direction, so that the synchronous movement of the first creasing carriage 6 and the second creasing carriage 7 during cutting and creasing of packaging paper is improved. Meanwhile, a convex-concave cam structure where a convex cam arranged at a lower part of a packaging paper surface is combined with a concave cam arranged at an upper part of the packaging paper surface is provided, and the rapid creasing at the back side of the packaging paper surface is completed by the three synchronous moving functions of the first creasing carriage 6, the second creasing carriage 7 and the first synchronous belt 9, so that the stress concentration fracture of paper fibers on the flat surface during the folding process of the packaging box is solved. That is, creasing is performed on the back side of the printed surface of the paper to avoid stress concentration fracture of the paper fibers on the printed surface of the paper on the flat surface.

Still referring to FIGS. 5 and 6 again, the paper pressing system 4 includes a pedestal 41 fixed between two side plates 81, four second roller shafts 45 are arranged in the pedestal 41 in parallel along a width direction, each of the second roller shaft 45 achieves the axial rotation function through a bearing assembly, and one end of the second roller extends out of an outer wall of the pedestal 41 to connect to a driving mechanism; a first roller shaft 42 is arranged above the pedestal 41, the first roller shaft 42 is vertically adjustably mounted by a first roller shaft fixing part 43, and an adjustable paper clamping passage is formed between the first roller shaft 42 and the second roller shaft 45.

The driving mechanism includes a power transfer part 46 arranged on the side plate 81 and a first motor 11 connected to the power transfer part; and the power transfer part 46 forms a linkage transmission with the four second roller shafts 45 through a double belt 47 mechanism. In addition, a tensioner 48 is provided to adjust the tension of the belt 47. It should be emphasized that the surfaces of the first roller shaft 42 and the second roller shaft 45 are both covered with a rubber sleeve 49, wherein an upper surface of the rubber sleeve 49 of the second roller shaft 45 protrudes out of a plane of the pedestal 41 to form a corresponding clamping surface with the rubber sleeve 49 of the first roller shaft 42.

Figure 6:
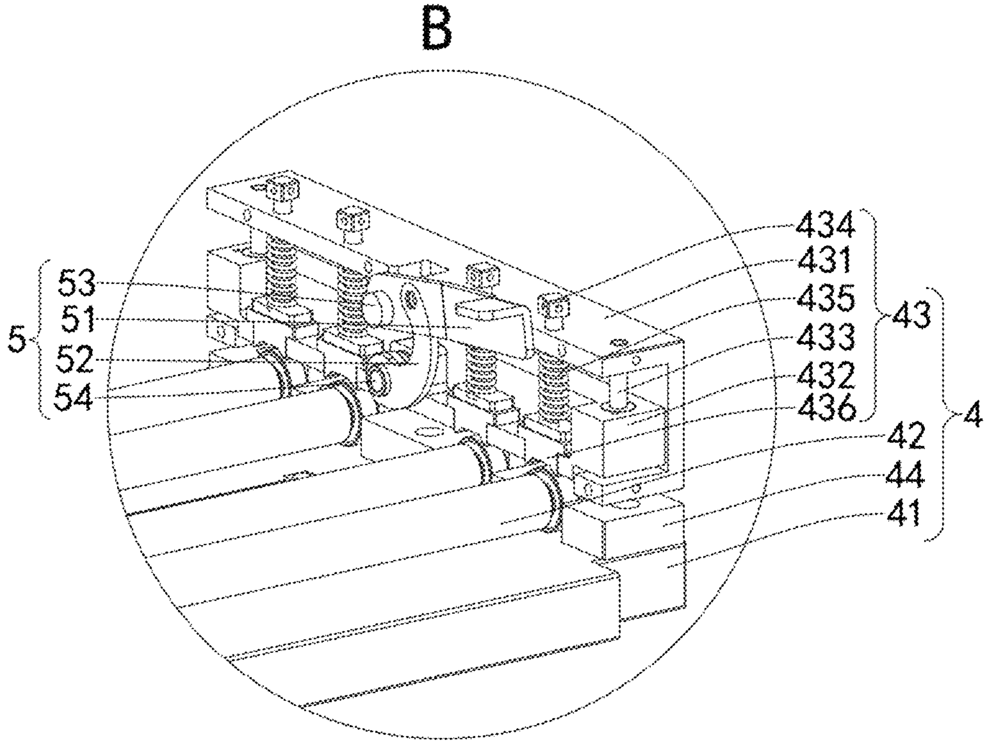
FIG. 6 is a partially enlarged schematic diagram of B in FIG. 5.

Still referring to FIG. 6, the first roller shaft fixing part 43 is composed of a roller shaft frame 431 with a groove, a shaft sleeve fixing frame 432 embedded in the groove, and a limiting component; the shaft sleeve fixing frame 432 fixes an end part of the first roller shaft 42 through four shaft sleeves 436; two limiting rods 433 are arranged in the groove to constrain the shaft sleeve fixing frame 432 to move only in the height direction; a top of the shaft sleeve 436 is connected to a pressure rod 434 extending upwards, and a first spring 435 is sleeved on a rod body of the pressure rod 434 in the groove; the paper pressing system control part 5 includes a first handle 51 pivotally connected to a roller shaft frame 431 (pivotally connected to the roller shaft frame 431 based on the first axis 53) and a second handle 52 pivotally connected to the sleeve fixing frame 432 (pivotally connected to the sleeve fixing frame 432 based on the second axis 54); and the first handle 51 and the second handle 52 are linked by a hinge mechanism. The operator drives the sleeve fixing frame 432 to move vertically by pulling the first handle 51, so as to adjust the clamping distance between the first roller shaft 42 and the second roller shaft 45.

Figure 5:
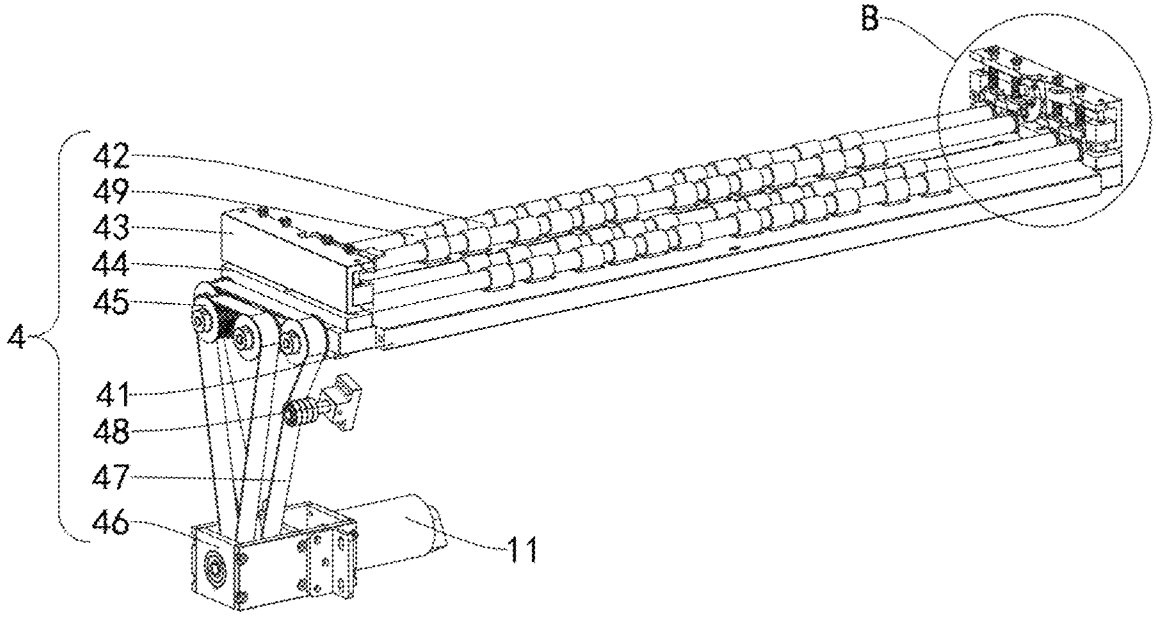
FIG. 5 is a schematic diagram of a structure of a paper pressing system according to the present invention.
Figure 7:
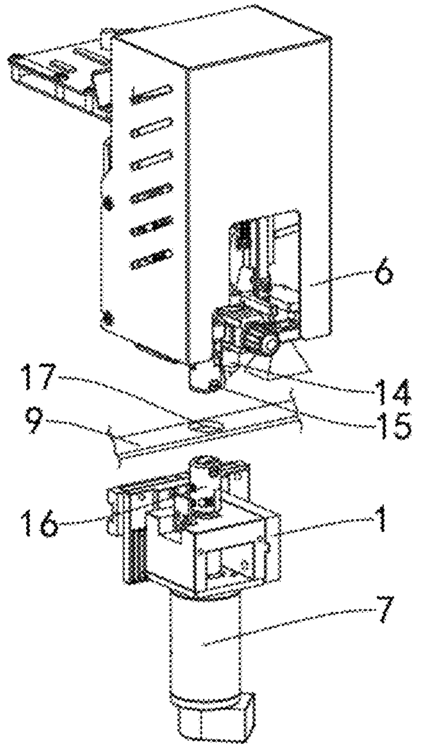
FIG. 7 is a schematic diagram of a structure of upper and lower creasing carriages according to the present invention.
Figure 8:
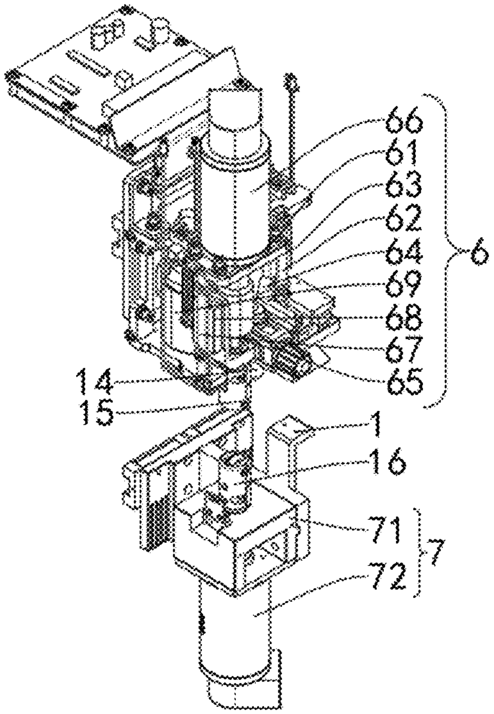
FIG. 8 is a schematic diagram of a subdivided structure of upper and lower creasing carriages according to the present invention.

Still referring to FIGS. 5, 7 and 8, a central area of the pedestal 41 is provided with a groove for accommodating the first synchronous belt 9, a through hole 17 is provided in the first synchronous belt 9 at a position corresponding to the groove, the groove is provided for mounting the first synchronous belt 9, and the first synchronous belt 9 is provided for supporting the paper passing through the groove and for supporting the paper during creasing or cutting. The through hole 17 is directly opposite to a position between a concave cam assembly 15 of the first creasing carriage 6 and a convex cam assembly 16 of the second creasing carriage 7. Specifically, a convex-concave cam structure where a convex cam arranged at a lower part of a packaging paper surface is combined with a concave cam arranged at an upper part of the packaging paper surface is provided, and the rapid creasing at the back side of the packaging paper surface is completed by the three synchronous moving functions of the first creasing carriage 6, the second creasing carriage 7 and the first synchronous belt 9, so that the stress concentration fracture of paper fibers on the flat surface during the folding process of the packaging box is solved. That is, creasing is performed on the back side of the printed surface of the paper to avoid stress concentration fracture of the paper fibers on the printed surface of the paper on the flat surface.

In this embodiment, the first synchronous belt 9 is fixedly connected to the second creasing carriage 7, so that the through hole 17 may be always kept on the same vertical line with the second creasing carriage 7, the first creasing carriage 6 and the second creasing carriage 7 are both powered by the second motor 13 to ensure that a transmission ratio between these two creasing carriages is the same and that the first creasing carriage 6 and the second creasing carriage 7 are on the same vertical line. Therefore, the first creasing carriage 6, the second creasing carriage 7 and the through hole 17 on the first synchronous belt 9 may be always on the same vertical line when moving.

The first creasing carriage 6 includes a first carriage frame 61 in sliding fit with the first slide rail 23, a fourth slide rail 67 and a second slider 68 driven by a second cylinder 69 are arranged inside the frame, the second slider 68 is fixedly connected to the concave cam assembly 15 and is controlled to achieve vertical displacement, and a third motor 66 arranged at the top of the frame drives the concave cam assembly 15 to rotate through a transmission mechanism.

The second creasing carriage 7 includes a second carriage frame 71 in sliding fit with the second slide rail 33, and a fourth motor 72 provided on a top of the second carriage frame directly drives the convex cam assembly 16 to rotate. The concave cam assembly 15 and the convex cam assembly 16 synchronously perform the creasing operation when the paper is conveyed to the top of the first synchronous belt 9 by the paper pressing system 4.

In this embodiment, the first creasing carriage 6 and the second creasing carriage 7 are equipped with position sensors, the position sensors may specify zero points of the concave cam assembly 15 and the convex cam assembly 16, and a zero point detection mechanism may ensure that the coordinate systems of the concave cam assembly 15 and the convex cam assembly 16 are strictly aligned in a three-dimensional space, so as to meet the positioning requirement of a precision assembly processing scenario.

In addition, the first carriage frame 61 is also provided with a third slide rail 62 and a first slider 63 driven by a first cylinder 64; the first slider 63 is fixedly connected to a tool holder 65; and the tool holder 65 is provided with a cutting knife 14. Therefore, the paper cutting and creasing equipment based on synchronous combination of convex and concave cams not only creases paper, but also cuts the paper based on set parameters.

Figure 9:
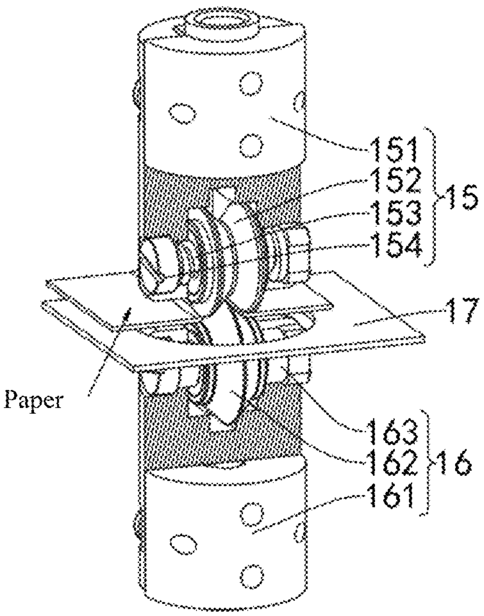
FIG. 9 is a schematic diagram of a structure of convex and concave cam assemblies according to the present invention.

Still referring to FIGS. 8 and 9, the concave cam assembly 15 includes a concave cam seat 151 in transmission connection with the third motor 66, the concave cam seat 151 is provided with a precisely machined U-shaped cam groove, and a concave cam 152 capable of rotating independently is mounted in the groove; and a surface of the concave cam 152 is provided with an annular creasing groove.

Correspondingly, the convex cam assembly 16 includes a convex cam seat 161 directly connected to the fourth motor 72, the configuration parameters of a groove provided in the convex cam seat form a mirror-symmetrical design with the concave cam seat 151, and an independently rotatable convex cam 162 (the convex cam 162 is fixed based on a convex cam shaft 163) is mounted in the groove, and the surface of the convex cam 162 is provided with an annular protrusion that exactly matches the groove of the concave cam 152.

During the creasing operation, the second cylinder 69 drives the concave cam assembly 15 to descend to the working position along the fourth slide rail 67, so that the concave cam 152 contacts the upper surface of the moving paper, and the convex cam 162 applies linear pressure upward from the lower surface of the paper to creasing the double-sided paper. The original single-sided creasing of the paper from above is changed to double-sided creasing of the paper through the cooperation of the convex cam 162 and the concave cam 152, so that when the convex cam 162 for single-sided creasing acts on the front side of the paper in a rolling and squeezing manner during the creasing process, the back side of the paper cannot form a corresponding deformation due to contact with a hard supporting platform, and the paper is not fractured due to stress concentration during the folding process, thereby preventing microcracks on the back side of the paper and even surface peeling.

In this embodiment, the cutting knife 14 may move up and down in the height direction under the drive of the first creasing carriage 6, and the cutting knife 14 and the concave cam assembly 15 are both provided with voice coil motors. The voice coil motor may adsorb the cutting knife 14 and the concave cam assembly 15 when working, so that the cutting knife 14 and the concave cam assembly 15 are in contact with the packaging paper surface to complete the creasing of the back side of the paper.

It should be noted that, in the present invention, terms “include”, “comprise”, or any other variants thereof are intended to cover a non-exclusive inclusion, so that a process, a method, an article, or a device that includes a list of elements includes those elements, and also includes other elements which are not expressly listed, or further includes elements inherent to this process, method, article, or device.

Although the embodiments of the present invention have been shown and described, it may be understood by those of ordinary skill in the art that various changes, modifications, substitutions, and alterations may be made to these embodiments without departing from the principle and purpose of the present invention.

The invention claimed is:

1. A paper cutting and creasing equipment based on synchronous combination of convex and concave cams, comprising a rack (8) and a paper pressing system (4); wherein a groove is formed in a center of the paper pressing system (4); and a first synchronous belt (9) entering the groove, wherein the first synchronous belt (9) is arranged below paper; the first synchronous belt (9) is also provided with a through hole (17); a first linear advancing part (2) is arranged above the paper pressing system (4), and a second linear advancing part (3) is arranged below the paper pressing system (4);

the first linear advancing part (2) is equipped with a first creasing carriage (6), and the second linear advancing part (3) is provided with a second creasing carriage (7); the second creasing carriage (7) is connected to the first synchronous belt (9) through an adapter block (1);

the first creasing carriage (6) is provided with a concave cam assembly (15) that coincides with an axis of the through hole (17) and is in rolling contact with paper from an upper part of the paper; and the second creasing carriage (7) is equipped with a convex cam assembly (16), and the convex cam assembly (16) passes through the through hole (17) and is in rolling contact with paper from a lower part of the paper.

2. The paper cutting and creasing equipment based on synchronous combination of convex and concave cams according to claim 1, wherein the concave cam assembly (15) and the convex cam assembly (16) are both axially rotatable; the first creasing carriage (6) and the second creasing carriage (7) drive the concave cam assembly (15) and the convex cam assembly (16) to move linearly; and the rack (8) drives paper to move back and forth.

3. The paper cutting and creasing equipment based on synchronous combination of convex and concave cams according to claim 1, wherein the concave cam assembly (15) comprises a concave cam seat (151) connected to the first creasing carriage (6), a cam groove is formed in the concave cam seat (151), and a concave cam (152) is arranged in the cam groove.

4. The paper cutting and creasing equipment based on synchronous combination of convex and concave cams according to claim 3, wherein the paper pressing system (4) comprises a pedestal (41) arranged on the rack (8); a plurality of second roller shafts (45) are arranged in the pedestal (41) in an array, and a first roller shaft (42) parallel to each of the second roller shafts (45) are arranged above the second roller shafts (45).

5. The paper cutting and creasing equipment based on synchronous combination of convex and concave cams according to claim 4, wherein the paper pressing system (4) further comprises a driving part for driving all the second roller shafts (45) to axially rotate and a first roller shaft (42) fixing part positioned at an end part of the first roller shaft (42), the first roller shaft (42) fixing part is equipped with a paper pressing system (4) control part, and the paper pressing system (4) control part controls all the first roller shafts (42) to move up and down relative to the pedestal (41).

6. The paper cutting and creasing equipment based on synchronous combination of convex and concave cams according to claim 5, wherein the first roller shaft (42) fixing part comprises a roller shaft frame (431) provided with a groove, a shaft sleeve fixing frame (432) is mounted in the groove, and a plurality of shaft sleeves (436) configured to fix the end part of the first roller shaft (42) are arranged on the shaft sleeve fixing frame (432) in an array.

7. The paper cutting and creasing equipment based on synchronous combination of convex and concave cams according to claim 6, wherein the first roller shaft (42) fixing part further comprises a pressure rod (434) arranged above the shaft sleeve (436) and passing through the roller shaft frame (431).

8. The paper cutting and creasing equipment based on synchronous combination of convex and concave cams according to claim 7, wherein a part of the pressure rod (434) positioned in the groove is sleeved with a first spring (435), and the first spring (435) applies downward pressure to the shaft sleeve fixing frame (432).

9. The paper cutting and creasing equipment based on synchronous combination of convex and concave cams according to claim 1, wherein the paper pressing system (4) control part comprises a second handle (52) mounted at a shaft sleeve fixing frame (432) and a first handle (51) arranged at a roller shaft frame (431), the second handle (52) is ratable rotatable at the shaft sleeve fixing frame (432), the first handle (51) is rotatable at the roller shaft frame (431), and the second handle (52) is hinged with the first handle (51).

10. The paper cutting and creasing equipment based on synchronous combination of convex and concave cams according to claim 9, wherein a cutting knife (14) moves up and down in a height direction under the drive of the first creasing carriage (6), the cutting knife (14) and the concave cam assembly (15) are both provided with voice coil motors, and the voice coil motors adsorb the cutting knife (14) and the concave cam assembly (15) when working, so that the cutting knife (14) and the concave cam assembly (15) are in contact with a packaging paper surface to complete creasing of a back side of the paper.

* * * * *